United States Patent [19]

Dobberpuhl

[11] 4,118,132
[45] Oct. 3, 1978

[54] ROTARY TILLER TINE ASSEMBLY WIRE CLIP

[75] Inventor: Dale Rudolph Dobberpuhl, Horicon, Wis.

[73] Assignee: Deere & Company, Moline, Ill.

[21] Appl. No.: 881,406

[22] Filed: Feb. 21, 1978

[51] Int. Cl.$^2$ ............................................. F16B 19/00
[52] U.S. Cl. .................................... 403/24; 403/317; 403/379; 172/753; 172/42; 85/8.3
[58] Field of Search ............... 403/378, 379, 324, 316, 403/317, 24; 280/515; 85/5 CP, 5 N, 8.3, 8.1; 24/201 LP; 172/555, 556, 753, 42, 43, 540, 548

[56] References Cited

U.S. PATENT DOCUMENTS

| 3,760,884 | 9/1973 | Webster et al. | 172/555 |
| 3,986,428 | 10/1976 | Ledford et al. | 85/8.3 |

FOREIGN PATENT DOCUMENTS 1,148,656  4/1969  United Kingdom .................... 403/379

Primary Examiner—Andrew V. Kundrat

[57] ABSTRACT

A pin for holding a rotary tiller tine hub in place on a shaft is, in turn, held in place by a wire clip having a straight intermediate section extending parallel to the shaft and received in a transverse hole extending through the pin adjacent an end thereof, the intermediate section extending perpendicular to and joining a straight end section and an arcuate section which embraces and extends about the hub.

2 Claims, 2 Drawing Figures

ROTARY TILLER TINE ASSEMBLY WIRE CLIP

BACKGROUND OF THE INVENTION

The present invention relates to rotary tiller and more specifically relates to the retention of rotary tiller tine hubs on driven shafts of the tiller.

One common way of connecting a rotary tiller tine hub to a driven shaft is the use of a bolt, which is received through aligned holes in the hub and shaft and held in place by a nut. This method of assembly is not entirely satisfactory because wrenches are required and the limited space between adjacent tines makes it difficult to work the wrenches. Additionally, the threads of the bolts are often abraded, during ordinary tilling operation, to the extent that the removal of the bolts for replacing worn or damaged tines is made difficult. Further, the bolt heads and nuts tend to engage plant stems and the like such as to cause them to wrap about the hubs.

Instead of using bolts and nuts for holding tine hubs on driven shafts, as described above, it is common to use a headed pin having a transverse hole therethrough, adjacent the end which is remote from the head, in which is received a cotter key or linch-pin. Inasmuch as the use of nuts and bolts is avoided with this manner of assembly, the attendant problems of working wrenches between the tines and difficulty of replacing the tines due to damaged threads are avoided. However, the problem of wrapping remains.

Another known rotary tiller construction embodies a constant diameter pin for retaining the tine hubs on the driven shafts, the pin having a hole adjacent one end thereof in which is received the opposite ends of a spring wire clip which is formed into an arcuate loop or bail that extends approximately 180° in parallel spaced relationship to the hub and is received over the opposite end of the pin. This assembly method overcomes all of the afore-mentioned problems. However, the space between the loop portion of the wire clip and the hub, which permits the loop to be deflected over the end of the pin so as to permit disassembly of the hub from the draft, sometimes becomes filled with dirt and/or debris, which must be removed before the desired deflection can be accomplished. Further, the loop design of the wire clip results in it being relatively expensive.

SUMMARY OF THE INVENTION

It is therefore an object of the present invention to provide for a novel and improved spring wire clip for retaining in place a pin holding a tiller tine hub on a shaft, the clip being shaped such as not to be subject to accidental release while at the same time being relatively inexpensive and easily manipulatable with the use of one hand both for installation and release.

A more specific object is to provide a wire clip, for the purpose set forth above, which is constructed so as to not have its function impaired by any dirt or debris which might collect on the tine hubs during operation.

These and other objects will become apparent from a reading of the ensuing description together with the appended drawing.

DESCRIPTION OF THE PREFERRED EMBODIMENT

Figure 1:
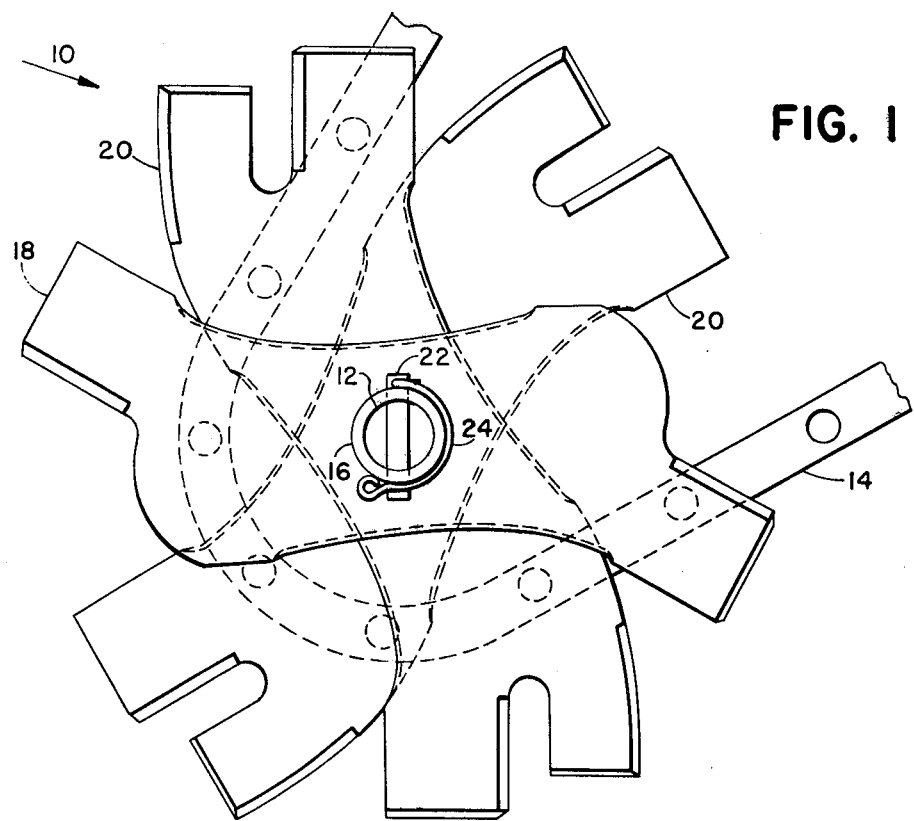
FIG. 1 is a left side elevational view showing of a rotary tiller rotor embodying the present invention.

Referring now to FIG. 1, therein is shown a rotary tiller 10 comprising a shaft 12 rotatably mounted in the lower end of a chain case 14. As considered in the forward direction of travel, only the left end of the shaft 12 is visible and mounted thereon is a hub 16 of a left end tine 18. A similar end tine (not visible) is mounted on the right end of the shaft 12 and mounted on the shaft 12 between the right and left end tine are hubs (not visible) of a plurality of central tines 20, only two of which are visible. Each of the tines has a similar means associated therewith for securing its hub to the shaft 12. Therefore, for the sake of brevity, only the means for securing the left end tine 18 to the shaft 12 is illustrated and described.

Figure 2:
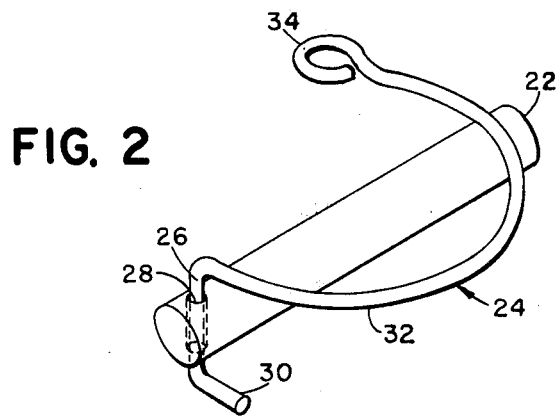
FIG. 2 is a perspective view of a pin together with a spring wire clip constructed according to the principles of the present invention.

Specifically, a constant diameter pin 22 extends through aligned openings located diametrically in the hub and shaft. A spring wire clip 24 is connected to the pin 22 and associated with the hub 16 such as to retain the pin in place. As can best be seen in FIG. 2, the clip 24 specifically includes an intermediate straight section 26 disposed in a hole 28 extending transversely through the pin 22 adjacent one end thereof. The straight section 26 is perpendicular to and joins a straight end section 30 of the clip with an intermediate arcuate section 32, the sections 30 and 32 lying in respective parallel planes. As can best be seen in FIG. 11, the arcuate section 32 embraces the hub 16 througout an arc slightly greater than 180° so that the arcuate portion will remain engaged with the hub once sprung thereover. The arcuate section 32 of the clip 24 joins a short looped end section 34 which serves to permit the thumb and index finger of one hand of an operator to be gripped thereon to facilitate springing the arcuate section 32 of the clip 24 sufficiently to remove it from or to engage it with the hub 16.

Thus it will be appreciated that the wire clip 24 is constructed such as to be easily applied and released while at the same time being relatively inexpensive due to its relatively simple shape and short wire length requirement.

The operation of the clip 24 is thought to be apparent from the foregoing description and accordingly no further operational description is given.

I claim:

1. In a rotary tiller rotor including a shaft, a tine structure including a cylindrical hub received on the shaft, the hub having a hole extending transversely therethrough and aligned with a hole provided in the shaft, a cylindrical pin received in the aligned holes of the hub and shaft and a spring wire clip, operative for holding the pin in place, being received in a transverse hole in said pin adjacent an end thereof, the improvement comprising: said spring wire clip including an intermediate section disposed parallel to said shaft and received in the transverse hole in the pin; said intermediate section having a first end joined to an end section of the clip which extends perpendicular to the intermediate section and a second end joined to an arcuate section, which embraces the hub throughout an arc of at least 180°.

2. In a rotary tiller rotor including a shaft, a cylindrical hub received on the shaft and held in place by a pin extending therethrough and through the shaft and a wire clip for holding the pin in place being received in a hole extending transversely through the pin adjacent an end thereof, the improvement comprising: said wire clip including an arcuate section extending through at least 180°, shaped complementary to the hub and located in a first plane; said clip further including a straight end section located in a second plane which is parallel to the first plane and a straight intermediate section extending perpendicular to the first and second planes and joining said arcuate and straight end sections; and said clip being installed with the intermediate section received in the hole in the pin and the arcuate section embracing said hub.

* * * * *